United States Patent [19]

Eguchi et al.

[11] Patent Number: 4,747,089
[45] Date of Patent: May 24, 1988

[54] METHOD AND APPARATUS FOR FOCUSING SERVO CONTROL

[75] Inventors: Naoya Eguchi, Tokyo; Mikio Sigiki, Kanagawa; Hitoshi Okada, Chiba, all of Japan

[73] Assignee: Sony Corporation, Tokyo, Japan

[21] Appl. No.: 939,614

[22] Filed: Dec. 9, 1986

[30] Foreign Application Priority Data

Dec. 21, 1985 [JP] Japan .................................. 60-286917

[51] Int. Cl.⁴ .......................... G11B 7/00; G11B 20/22
[52] U.S. Cl. ...................................... 369/45; 369/46; 369/124
[58] Field of Search ...................... 369/44, 45, 46, 124; 250/206 DF

[56] References Cited

U.S. PATENT DOCUMENTS

4,163,149  7/1979  Sawano et al. ........................ 369/45
4,446,545  5/1984  Van Dijk ................................ 369/44

Primary Examiner—Donald McElheny, Jr.
Attorney, Agent, or Firm—Philip M. Shaw, Jr.

[57] ABSTRACT

A focusing control method and apparatus employing a photodetector for generating a focusing error signal, a tracking error signal and an RF signal, and a closed loop focusing servo circuit responsive to the focusing error signal applied thereto for focusing a light spot in position on an optical disc. The focusing error signal is detected synchronously with the tracking error signal to produce a first periodic function signal. The focusing error signal is detected synchronously with the RF signal to produce a second periodic function signal. The tracking error signal is converted into a sin-wave signal having a predetermined amplitude. The RF signal is converted into a cos-wave signal having a predetermined amplitude. The first periodic function signal is multiplied by the cos-wave signal to produce a first component signal. The second periodic function signal is multiplied by the sin-wave signal to produce a second component signal. The first and second component signals are added to produce a composed disturbance signal. The composed disturbance signal is subtracted from the focusing error signal applied to the focusing servo circuit, thereby canceling a disturbance superimposed on the focusing error signal applied to the focusing servo circuit.

5 Claims, 12 Drawing Sheets

METHOD AND APPARATUS FOR FOCUSING SERVO CONTROL

BACKGROUND OF THE INVENTION

This invention relates to a method and apparatus for focusing servo control.

It is the current practice to read the data recorded on an optical disc recording track by applying a laser beam through an objective lens which focuses a light spot on the recording track. In order to provide clear data recognition, the objective lens should be adjusted, with great accuracy, at a proper position with respect to the optical disc recording track. For this purpose, a deviation of the actual objective lens position from the optimum objective lens position is converted into a focusing error signal which is applied to a closed loop focusing servo circuit operable to reduce the focusing error signal to zero. Various methods, which includes an astigmatic method, a knife edge method, a Foucault prism method, a critical angle method and the like, have been proposed to produce such a focusing error signal. In either of these methods, a light beam reflected from the optical disc is applied through a lens which focuses a light spot on the divided portions of a photoelectric converter element. However, the reflected light beam includes 0-order and ± first-order diffraction beams which interfere on the photoelectric converter. Each time the light spot traverses the optical disc recording track, the intensities of the 0-order and ± first-order diffraction beams change greatly to superimpose a great disturbance on the focusing error signal. The disturbance has serious influence on the focusing servo control in a direction saturating the dynamic range of the focusing servo circuit to place the focusing servo control into a lock-off condition particularly during an access mode of operation searching the information recorded on the optical disc recording track.

SUMMARY OF THE INVENTION

A main object of the invention is to provide an improved focusing servo control method and apparatus effective to cancel a disturbance which may be superimposed on a focusing error signal applied for a focusing servo circuit operable to reduce the focusing error signal to zero particularly when an optical pickup traverses a recording track.

There is provided, in accordance with the invention, a focusing control method employing a photodetector for generating a focusing error signal, a tracking error signal and an RF signal, and a closed loop focusing servo circuit responsive to the focusing error signal applied thereto for focusing a light spot in position on an optical disc. The method comprising the steps of detecting the focusing error signal synchronously with the tracking error signal to produce a first periodic function signal, detecting the focusing error signal synchronously with the RF signal to produce a second periodic function signal, converting the tracking error signal into a sin-wave signal having a predetermined amplitude, converting the RF signal into a cos-wave signal having a predetermined amplitude, multiplying the first periodic function signal by the cos-wave signal to produce a second component signal, adding the first and second component signals to produce a composed disturbance signal, and subtracting the composed disturbance signal, from the focusing error signal applied to said focusing servo circuit, thereby canceling a disturbance superimposed on the focusing error signal applied to the focusing servo circuit.

In another aspect, the invention provides a focusing control apparatus including a photodetector for generating a focusing error signal, a tracking error signal, and an RF signal, and a closed loop focusing servo circuit responsive to the focusing error signal applied thereto for focusing a light spot in position on an optical disc. The apparatus comprising a canceling signal generator coupled to the photodetector for producing a canceling signal. The canceling signal generator includes means for detecting the focusing error signal synchronously with the tracking error signal to produce a first periodic function signal, means for detecting the focusing error signal synchronously with the RF signal to produce a second periodic function signal, means for converting the tracking error signal into a sin-wave signal having a predetermined amplitude, means for converting the RF signal into a cos-wave signal having a predetermined amplitude, means for multiplying the second periodic function signal by the sin-wave to produce a second component signal, and means for adding the first and second component signals to produce the canceling signal. The focusing servo circuit including means coupled to the canceling signal generator for subtracting the canceling signal from the focusing error signal applied to the focusing servo circuit, thereby canceling a disturbance superimposed on the focusing error signal applied to the focusing servo circuit.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

FIGS. 10(a)–(c) contain three waveforms used in explaining production of a periodic function signal;

FIGS. 11(a)–(c) contain three waveforms used in explaining production of an other periodic function signal;

FIGS. 12(a)–(c) contain three waveforms used in explaining production of a first component signal;

FIGS. 13(a)-(c) contain three waveforms used in explaining production of a second component signal;

FIGS. 14(a)-(c) contain three waveforms used in explaining the disturbance canceling operation;

FIGS. 16(a) and (b) contain two waveforms of the focusing-error and drive signals obtained in the presence of a great disturbance on the focusing error signal; and FIGS. 17 (a) and (b) contain two waveforms of the focusing-error and drive signals obtained after the disturbance is cancelled.

DETAILED DESCRIPTION OF THE INVENTION

Prior to the description of the preferred embodiments of the invention, the principle of the invention is briefly described in order to provide a basis for a better understanding of the invention.

Figure 1:
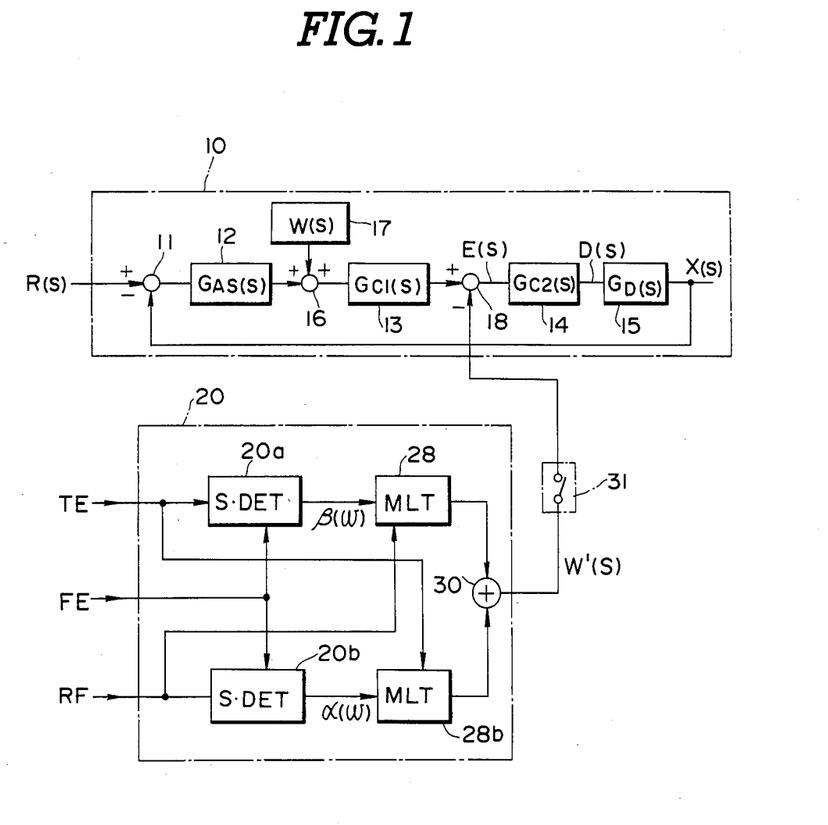
FIG. 1 is a block diagram used in explaining the principles of the invention.
Figure 2:
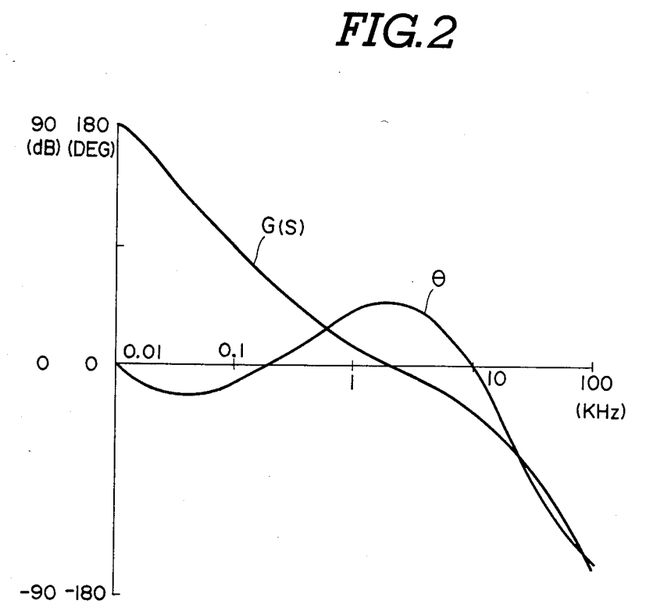
FIG. 2 is a graph of frequency versus gain and time delay used in representing the characteristics of the closed loop focusing servo circuit.

Referring to FIG. 1, the numeral 10 designates a closed loop focusing servo circuit to which a target signal R(S) is applied. The target signal R(S) corresponds to a disc surface deflection or an upward or downward change of position of the disc surface. The target signal R(S) is coupled to an input of an adder 11 having another input at which it receives a feedback signal X(S) indicative of a change of position of the objective lens. The adder 11 subtracts the feedback signal from the target signal and generates an error signal indicative of a change of position of the objective lens relative to the disc. The error signal is applied to a photoelectric converter 12 which converts the error signal into a corresponding electrical signal. The electrical signal is fed to a focussing error detector 13. The focussing error detector 13 generates a focussing error signal E(S) to a phase compensating circuit 14 which generates a drive signal D(S). The drive signal D(S) is applied to a focusing actuator which thereby moves the objective lens with respect to the disc surface in a direction tending to achieve the target position. The characters $G_{AS(S)}$, $G_{C1(S)}$, $G_{C2(S)}$, and $G_{D(S)}$ designate the gains or sensitivities of the respective components 12, 13, 14 and 15. The characteristics of the closed loop control circuit of FIG. 1 are shown in FIG. 2, where G(S) is the closed loop gain given as $G_{AS(S)} \times G_{C1(S)} \times G_{C2(S)} \times G_{D(S)}$ and 0 is the phase delay.

A disturbance W(S) is shown schematically as introduced in the signal to the focusing error detector 13. The disturbance W(S) is produced due to the interference of the 0-order and O first order diffraction beams included in the light beam reflected from the optical disc. The disturbance introduced into the focusing error signal E(S) has a serious influence on the focusing error signal E(S) and the drive signal D(S) in a direction saturating the dynamic range of the focusing servo circuit to place the focusing servo control into a lock-off condition.

Figures 3A, 3B:
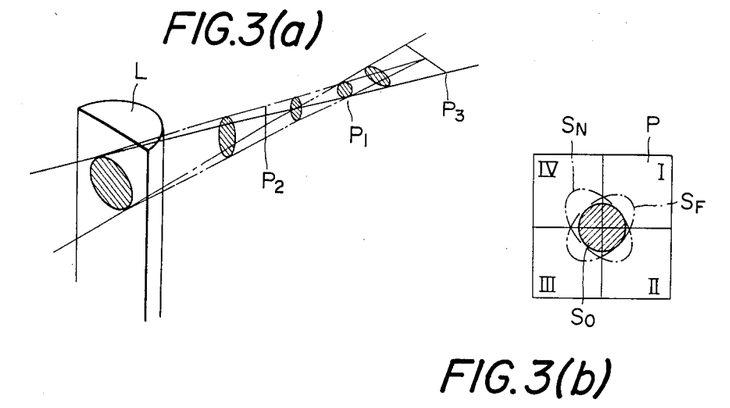
FIGS. 3a and 3b contain views used in explaining an astigmatic method.

The mechanism of introduction of the disturbance W(S) will be described in greater detail under an assumption that the focusing error signal E(S) is obtained according to an astigmatic method which utilizes a photodetector P placed at a position $P_1$ intermediate between the two astigmatic points $P_2$ and $P_3$ of the light beam which has reflected from the optical disc and has passed through a cylindrical lens L, as shown in FIG. 3(a). The photodetector P has four divided portions I, II, III and IV separated from one another, as shown in FIG. 3(b). The shape and position of the reflected light spot formed on the photodetector P is dependent upon the distance between the optical disc and the objective lens. In FIG. 3(b), the character $S_O$ indicates a circular light spot formed on the photodetector P when the objective lens is positioned in focus with respect to the optical disc, the character $S_N$ indicates an elliptical light spot formed on the photodetector P when the objective lens is at a shorter distance from the optical disc, and the character $S_F$ indicates an elliptical light spot formed on the photodetector P when the objective lens is at a longer distance from the optical disc. When a light spot is formed on the photodetector P, currents $I_I$, $I_{II}$, $I_{III}$ and $I_{IV}$ are derived from the respective divided portions I, II, III and IV of the photodetector P. The focussing error signal E(S) is obtained in such a manner as expressed as $E(S) = (I_I + I_{III}) - (I_{II} + I_{IV})$.

Figure 4:
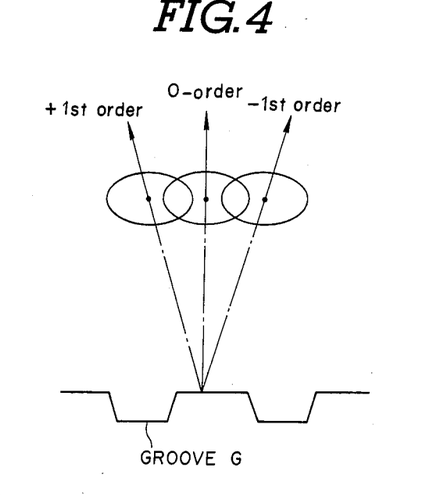
FIG. 4 is a diagram showing the diffraction beams included in a light beam reflected from an optical disc.
Figure 5:
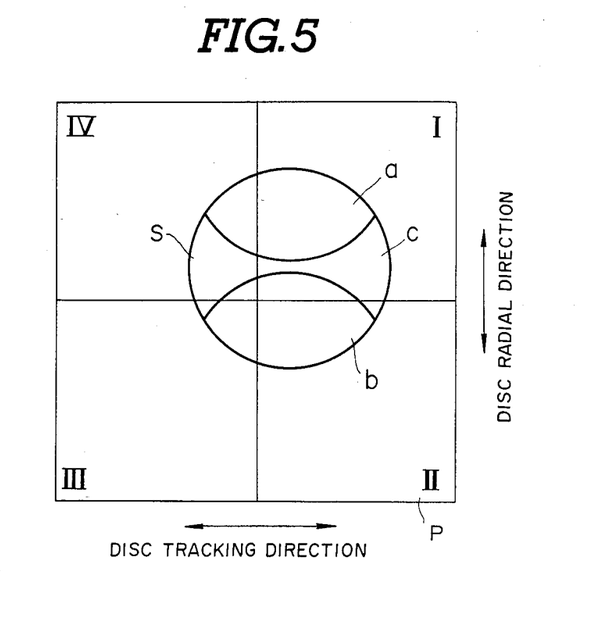
FIG. 5 is a diagram showing a light spot projected on a photodetector.

The disturbance W(S) is introduced into the focusing error signal E(S) due to the diffraction of the light beam reflected from the optical disc, as shown in FIG. 4, where the light beam reflected from the optical disc is diffracted and it includes 0-order and ± first-order diffraction beams, these diffraction beams having intensities dependent on the position of the light spot with respect to the recording track. This is true particularly for an optical disc of the data writing type formed with gooves G. The 0-order and + first-order diffraction beams interfere on the photodetector P, as shown in FIG. 5, where the character a indicates the area where the 0-order and + first-order diffraction beams are interfered, the character b indicates the area where the 0-order and − first-order diffraction beams are interfered, and the character c indicates the area on which only the 0-order diffraction beam strikes. Even a small deviation of the reflected light spot S from the center of the photodetector P causes a great increase of the disturbance. The reflected light spot S will deviate from the center of the photodetector P due to optical system offset, disc skew, various astigmatic perturbations. The disturbance level changes each time the light spot traverses the recording track. Particularly during an access mode of operation searching recorded information, a great disturbance is introduced into the focusing error signal, causing saturation of the servo circuit dynamic range to place the focussing servo control into a lock-off condition.

The influence of the introduced disturbance on the focusing error signal E(S) and the drive signal D(S) may be expressed as:

$$E(S) = \frac{G_{C1}(S)}{1 + G(S)} \cdot W(S), \quad (1)$$

$$D(S) = \frac{G_{C1}(S) \, G_{C2}(S)}{1 + G(S)} \cdot W(S) \quad (2)$$

Figure 6:
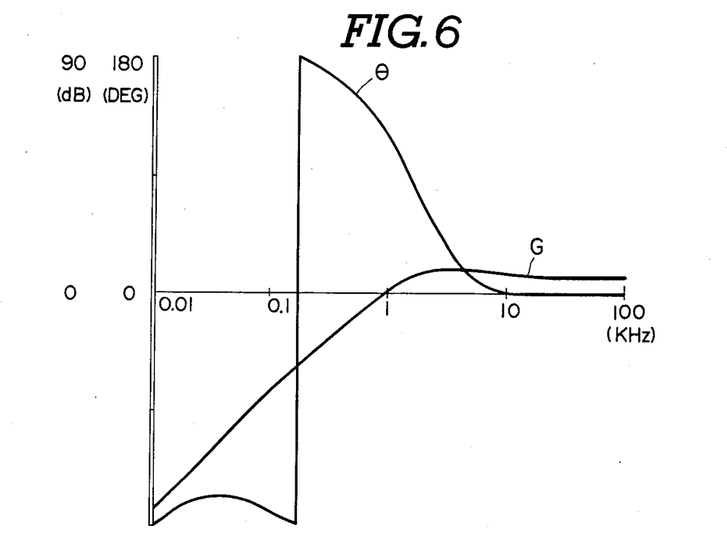
FIG. 6 is a graph of frequency versus gain and time delay used in explaining the offset residual on the focusing error signal.
Figure 7:
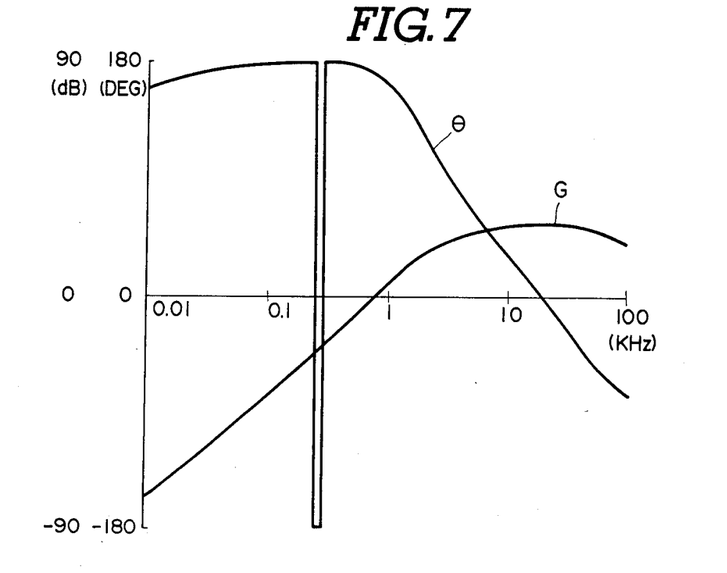
FIG. 7 is a graph of frequency versus gain and time delay used in explaining the offset residual on the drive signal.

FIGS. 6 and 7 show the residual offset transfer characteristics for the ratios E(S)/W(S) and D(S)/W(S), respectively, in the presence of a disturbance W(S) introduced into the closed loop control circuit of FIG. 1. It will be seen that the gain for the ratio D(S)/W(S) is about 20 dB greater than the gain for the ratio E(S)/W(S) at frequencies greater than 10 kHz. The reason for this is that the drive signal D(S) is produced at the output of the phase compensating circuit 13 to which the focussing error signal E(S) is applied.

Figure 8:
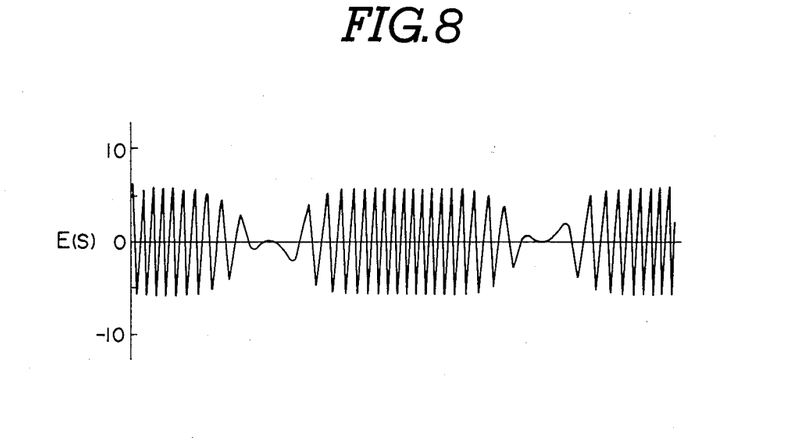
FIG. 8 shows a waveform of the focusing error signal.
Figure 9:
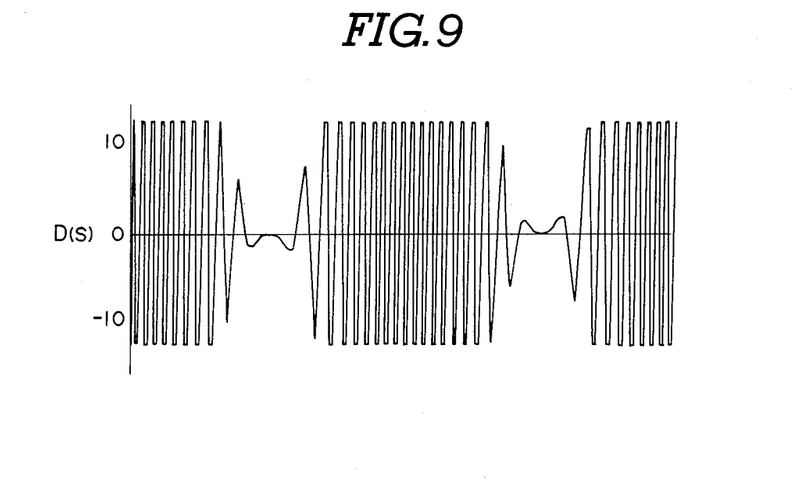
FIG. 9 shows a waveform of the drive signal.

FIG. 8 shows an output signal waveform which may occur at the output of the focusing error detector 13 when the introduced disturbance has a frequency around 10 kHz. Such a focusing error signal E(S) is applied to the phase compensating circuit 14 where it is amplified, as can be seen from the transfer characteristic curve of FIG. 7, to exceeds the dynamic range. The result is that the drive signal D(S) saturates at voltages exceeding the power source voltages, as shown in FIG. 9. This saturation places the focusing servo control into a lock-off condition to bring the objective lens to a defocus position.

The disturbance W(S) introduced into the closed loop control circuit will be described in greater detail.

Assuming that the pupil function corresponds to a uniform circle opening, the following equations provide proper approximations of light intensities Ia, Ib and Ic on the respective areas a, b and c:

$$Ia = A + 2B\cos(\phi + 2\pi v/q)$$
$$Ib = A + 2B\cos(\phi - 2\pi v/q) \quad (3)$$
$$Ic = C$$

where A is the sum of the light intensities of the 0-order diffraction beam R(0) and the $\pm$ first order diffraction beams R($\pm$1) and expressed as $A=|R(0)|^2+|R(\pm1)|^2$, B is the product of the 0-order diffraction beam R(0) and the $\pm$ first order diffraction beams R($\pm$1) and expressed as $B=|R(0)|\times|R(\pm1)|$, C is the light intensity of the 0-order diffraction beam R(0) and expressed as $C=|R(0)|^2$, $\phi$ is the phase difference between the 0-order diffraction beam R(0) and the + or − first order diffraction beam and expressed as $\exp[i\phi]=\{R(0)\times R(\pm1)^c\}/\{|R(0)|\times|R(\pm1)^c|\}$, q is the optical disc track pitch, and v is the position of the light spot relative to the center of the optical disc.

It can be seen from these equations that, each time the light spot traverses the recording track or groove, the light intensity Ia on the area a changes in a positive or negative direction with respect to a constant value A and the light intensity Ib on the area b changes with respect to the constant value A in a direction opposite to the direction of change of the light intensity Ia, whereas the light intensity Ic on the area c is held substantially at a constant value C.

According to the astigmatic method, a focusing error signal FE is provided in such a manner as expressed by the following equation:

$$FE = (I_I + I_{III}) - (I_{II} + I_{IV}) \quad (4)$$

where $I_I$, $I_{II}$, $I_{III}$ and $I_{IV}$ are the currents obtained from the respective divided photodetector portions I, II, III and IV.

Using equations (3) which express the light intensities on the areas a, b and c, equation (4) is rewritten as:

$$FE = D + (E - F)\sin\phi\,\sin(2\pi v/q) \quad (5)$$
$$+ (E + F)\cos\phi\,\cos(2\pi v/q)$$

where E is the value corresponding to the product of 2B and the difference of the area a on the divided photodetector portions I and III from the area a on the divided photodetector portions II and IV, F is the value corresponding to the product of 2B and the difference of the area b on the divided photodetector portions I and III from the area b on the divided photodetector portions II and IV, and D is the product of A, B and the difference of the area a, b and c on the divided photodetector portions I and III from the areas a, b and c on the divided photodetector portions II and IV. The value D is approximately zero.

Therefore, equation (5) is simplified as:

$$FE = M\sin(2\pi v/q + \Psi_1) \quad (6)$$

where $$M = \sqrt{(E-F)^2\sin^2\phi + (E+F)^2\cos^2\phi}, \text{ and}$$

$$\Psi_1 = \tan^{-1}((E+F)/((E-F)\tan\Theta)).$$

Since equation (6) expresses the focusing error signal FE when R(S)=0; that is, when the light spot is in focus on the optical disc, it also expresses the disturbance W(S) introduced into the closed loop control circuit 10. Such a disturbance W(S) occurs particularly when the light spot is offset from the center of the photodetector P and changes due to disc skew. Although the disturbance W(S) cannot measured directly in the closed loop control circuit, it presents as a residual offset on the focusing error signal W(S) as shown in FIG. 8.

The residual offset transfer characteristic E(S)/W(S) can be expressed as:

$$E(S)/W(S) = G(\omega)\cdot\exp[j\Psi_2(\omega)] \quad (7)$$

This equation is rewritten as:

$$E(S) = MG(\omega)\sin[2\pi v/q + \Psi_1 + \Psi_2(\omega)] \quad (8)$$

The gain $G(\omega)$ and the phase $\Psi_2(\omega)$ vary with variations in frequency, as shown in FIG. 6.

Equation (8) can be expanded in the following form:

$$E(S) = MG(\omega)\cos(\Psi_1 + \Psi_2(\omega))\sin(2\pi V/q) + \quad (9)$$
$$MG(\omega)\sin(\Psi_1 + \Psi_2(\omega))\cos(2\pi V/q)$$

and $$E(S) = \alpha(\omega)\sin(2\pi v/q) + \beta(\omega)\cos(2\pi v/q) \quad (10)$$

where $$\alpha(\omega) = MG(\omega)\cos(\Psi_1 + \Psi_2(\omega)),$$

$$\beta(\omega) = MG(\omega)\sin(\Psi_1 + \Psi_2(\omega))$$

It can be seen from equation (10) that the disturbance W(S) introduced into the closed loop control circuit 10 can be measured from the measurements of the periodic function $\alpha(\omega)$ and $\beta(\omega)$. Description will be made to the measurement of the disturbance W(S).

As well known in the art, the tracking error signal is zero when the light spot is on the track formed in on the optical disc and has a positive or negative value when the light spot is offset from the track. When the light spot traverses the recording track, for example, during an access mode of operation, the tracking error signal TE is expressed as:

$$TE = V_T\sin(2\pi v/q)$$

where q is the track pitch and V is the position of the light spot with respect to the center of the optical disc.

The main or RF signal obtained from the photodetector during such an access mode is at maximum when the light spot is on the recording track and thus the tracking error signal TE is at minimum. The RF signal is expressed as:

$$RF = V_R \cos(2\pi v/q)$$

Referring to equation (10), the following conditions occur when $\cos(2\pi v/q) = 0$:
(i) when $v = q/4$, $\sin(2\pi v/q) = 1$ and thus $E(S) = \alpha(\omega)$
(ii) when $v = 3q/4$, $\sin(2\pi v/q) = -1$ and thus $E(S) = -\alpha(\omega)$
(iii) when $v = 0$, $\cos(2\pi v/q) = 1$ and thus $E(S) = \beta(\omega)$, and
(iv) when $b = q/2$, $\cos(2\pi v/q) = -1$ and thus $E(S) = -\beta(\omega)$ If the focusing error signal E(S) is sampled and held when $\cos(2\pi v/q) = 0$; that is, when the main or RF signal is zero, the sampled value will correspond to the periodic function $\alpha(\omega)$ or $-\alpha(\omega)$. The polarity of the focusing error signal E(S) is reversed to obtain the periodic function signal $\alpha(\omega)$ when $v = 3q/4$; that is, when the polarity of the tracking error signal TE is negative. Similarly, if the focusing error signal E(S) is sampled and held when $\sin(2\pi v/q) = 0$; that is, when the tracking error signal TE is zero, the sampled value will correspond to the periodic function $\beta(\omega)$ or $-\beta(\omega)$. The polarity of the focusing error signal E(S) is reversed to obtain the periodic function signal $\beta(\omega)$ when the polarity of the AC component of the main or RF signal is negative.

Figure 10:
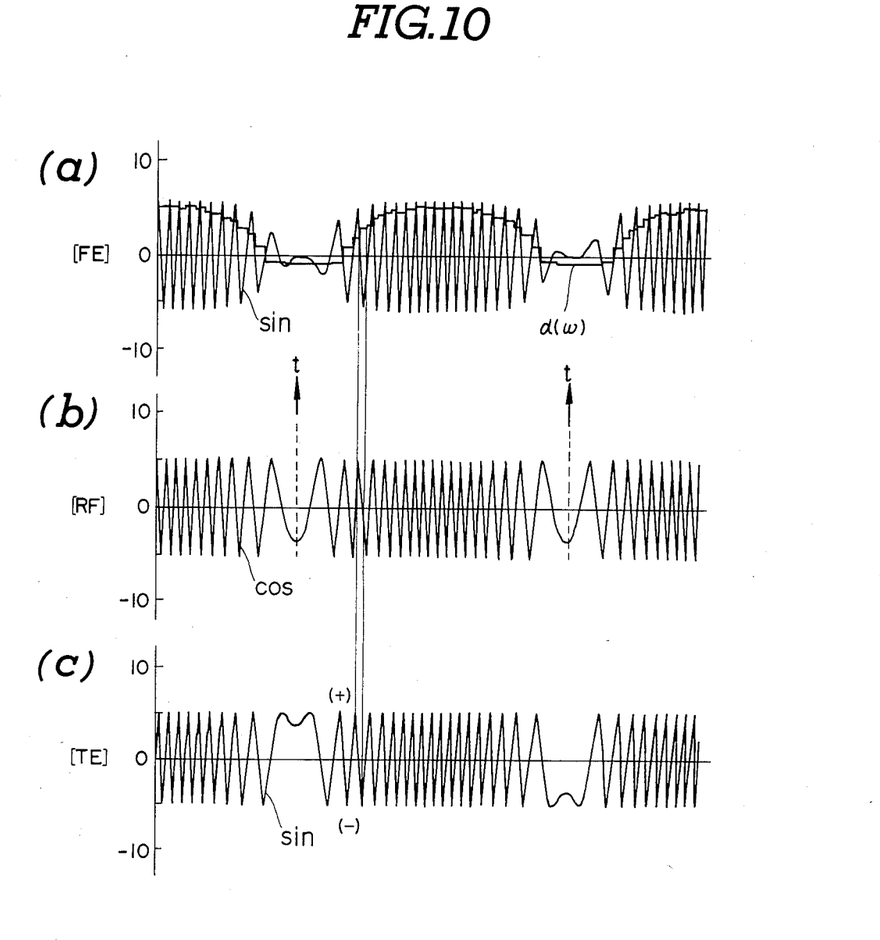

FIG. 10 shows several waveforms obtained at the outputs of the photodetector while the light spot is traversing the recording track or groove formed on the optical disc which is placed in a somewhat eccentric manner. The waveform 10a relates to the focussing error signal FE, the waveform 10b relates to the main or RF signal, and the waveform 10c relates to the tracking error signal TE. The time interval t—t indicates the time required for a full rotation of the optical disc. The illustrated focusing error signal FE has a major portion residual due to the disturbance introduced thereon when the light spot traverses the recording track or groove. It is apparent from FIG. 10 that the main or RF signal is expressed as $\cos(2\pi v/q)$ and the tracking error signal is expressed as $\sin(2\pi v/q)$. It is, therefore, possible to obtain the periodic function signal $\alpha(\omega)$ by sampling the focusing error signal FE each time the main or RF signal crosses zero and reversing the polarity of the sampled value if the tracking error signal TE is negative at the sampling time. The bold curve on the waveform 10a indicates the resulting periodic function signal $\alpha(\omega)$.

Figure 11:
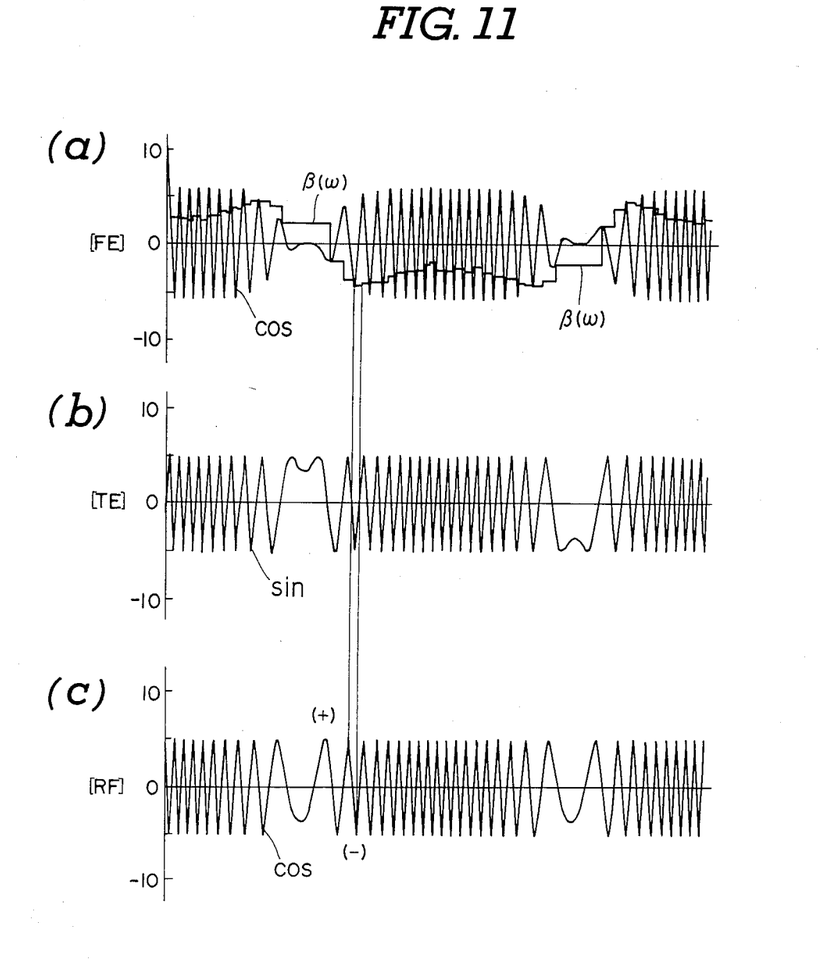

FIG. 11 shows several waveforms obtained at the outputs of the photodetector while the light spot is traversing the recording track or groove formed on the optical disc. The waveform 11a relates to the focusing error signal FE, the waveform 11b relates to the tracking error signal TE, and the waveform 11c relates to the main or RF signal. The time interval t—t indicates the time required for a full rotation of the optical disc. It is possible to obtain the periodic function signal $\beta(\omega)$ by sampling the focusing error signal FE each time the tracking error signal TE crosses zero and reversing the polarity of the sampled value if the polarity of the main or RF signal is negative. The bold curve on the waveform 11a indicates the resulting periodic function signal $\beta(\omega)$.

As can be seen from equation (10), the disturbance W(S) can be obtained by multiplying the periodic function signal $\alpha(\omega)$ by $\sin(2\pi v/q)$, multiplying the periodic function signal $\beta(\omega)$ by $\cos(2\pi v/q)$, and adding these products. It will be understood that $\sin(2\pi v/q)$ corresponds to the tracking error signal TE having a constant amplitude, for example, 1 and $\cos(2\pi v/q)$ corresponds to the main or RF signal having a constant amplitude, for example, 1.

Figure 12:
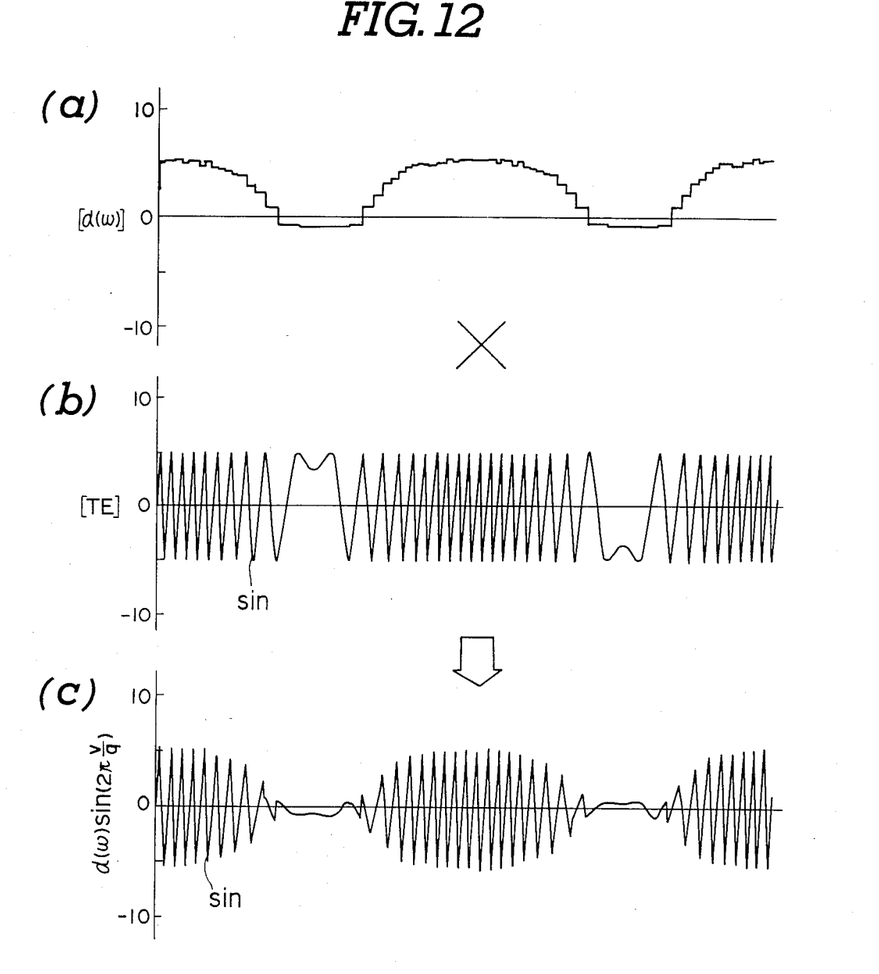

Referring to FIG. 12, the waveform 12a relates to the periodic function signal $\alpha(\omega)$ which is multiplied by the tracking error signal TE, as shown by the waveform 12b, to produce a first disturbance component $\alpha(\omega)\sin(2\pi v/q)$, as shown by the waveform 12c.

Figure 13:
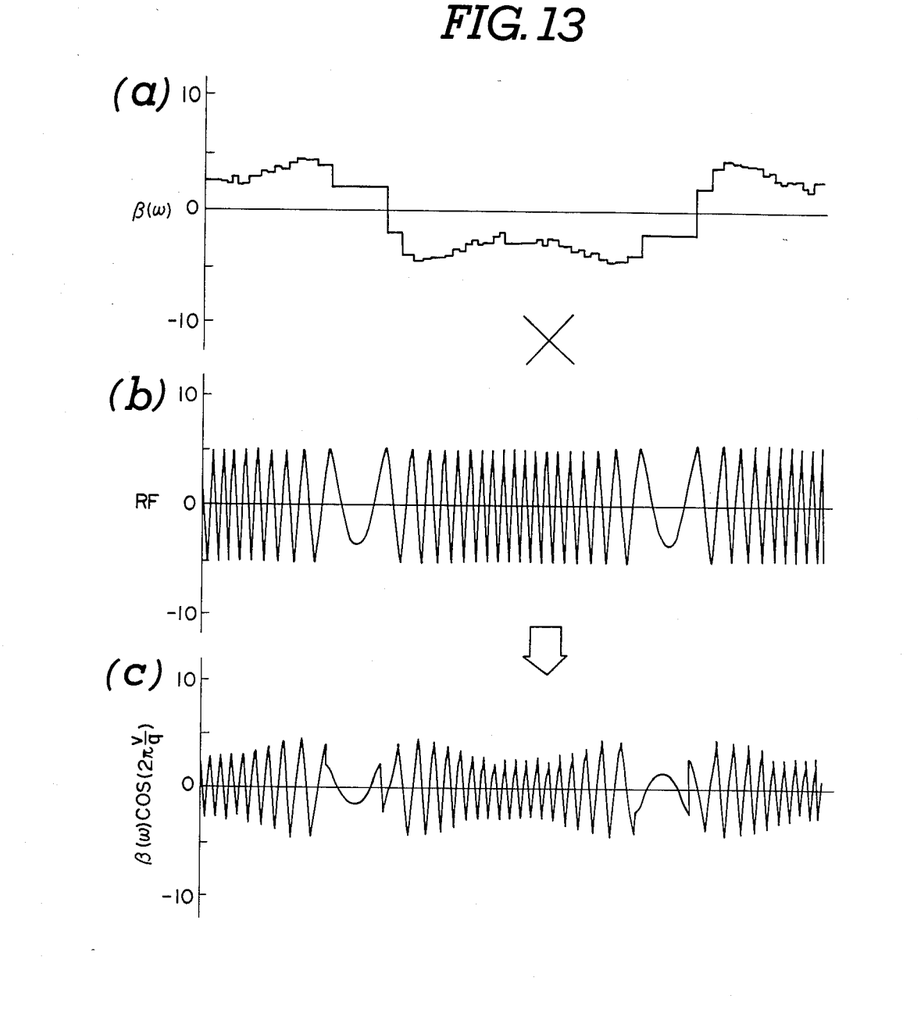

Referring to FIG. 13, the waveform 13a relates to the periodic function signal $\beta(\omega)$ which is multiplied by the main or RF signal, as shown by the waveform 13b, to produce a second disturbance component $\beta(\omega)\cos(2\pi v/q)$, as shown by the waveform 13c.

The produced first and second disturbance components are added to obtain a composed disturbance W'(S). A signal indicative of the composed disturbance is applied to the adder 18 of the closed loop control circuit 10 so as to cancel the disturbance W(S) superimposed on the focusing error signal E(S) in order to obtain the primary focusing error signal E(S).

Figure 14:
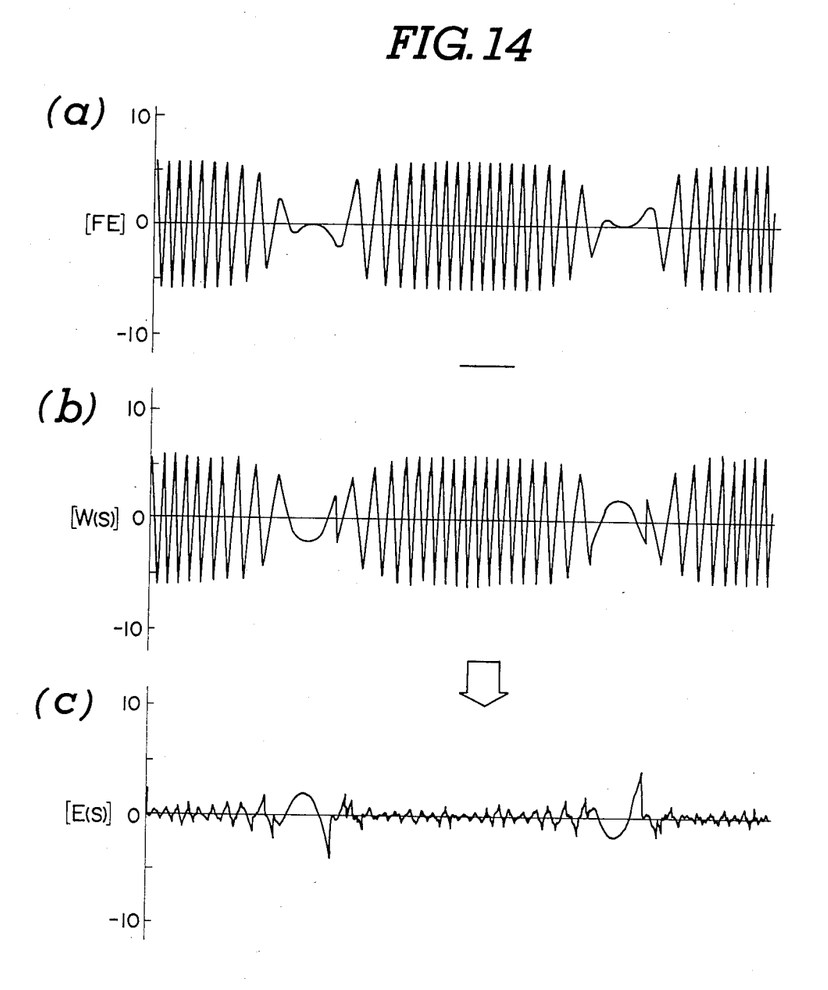

Referring to FIG. 14, the waveform 14a relates to the focusing error signal FE from which the composed disturbance W'(S), as shown by the waveform 14b, is substracted to provide a primary focusing error signal E(S), as shown by the waveform 14c.

Although the composed disturbance is not equal completely to the disturbance superimposed on the focussing error signal E(S) since the composed disturbance is obtained by sampling the focusing error signal FE at time intervals, the difference is too small to saturate the closed loop focusing servo circuit, resulting in a focusing lock-off condition.

Returning to FIG. 1, a disturbance canceling circuit, generally designated by the numeral 20, includes first and second synchronous detectors 20a and 20b. The first synchronous detector 20a detects the focusing error signal FE synchronously with the tracking error signal TE to produce a periodic function signal $\beta(\omega)$ which corresponds to the signal shown by the waveform 13a of FIG. 13. The periodic function signal $\beta(\omega)$ is applied to a first multiplier circuit 28a to which the RF signal having a constant amplitude is applied. The RF signal corresponds to the signal shown by the waveform 13b of FIG. 13. The first multiplier circuit 28a multiplies the periodic function signal $\beta(\omega)$ by the RF signal to produce a first signal which corresponds to the signal shown by the waveform 13c of FIG. 13. The second synchronous detector 20b detects the focusing error signal synchronously with the RF signal to produce a periodic function signal $\alpha(\omega)$ which corresponds to the signal shown by the waveform 12a of FIG. 12. The periodic function signal $\alpha(\omega)$ is applied to a second multiplier circuit 28b to which the tracking error signal TE having a constant amplitude is applied. The tracking error signal TE corresponds to the signal shown by the waveform 12b of FIG. 12. The second multiplier circuit 28b multiplies the periodic function signal $\alpha(\omega)$ by the tracking error signal TE to produce a second signal which corresponds to the signal shown by the waveform 12c of FIG. 12. The first and second signals are applied to an adder circuit 30 where they are added to produce a signal indicative of a composed disturbance W'(S) which corresponds to the waveform 14b of FIG. 14. The composed disturbance indicative signal W'(S) is applied through a switch 31 to the adder circuit 18 interposed between the focusing error detector 13 and the phase compensating circuit 14 of the focusing servo circuit 10 in order to cancel the disturbance W(S) introduced on the focusing error signal FE. The switch 31 is closed when the tracking control is off.

Figure 15:
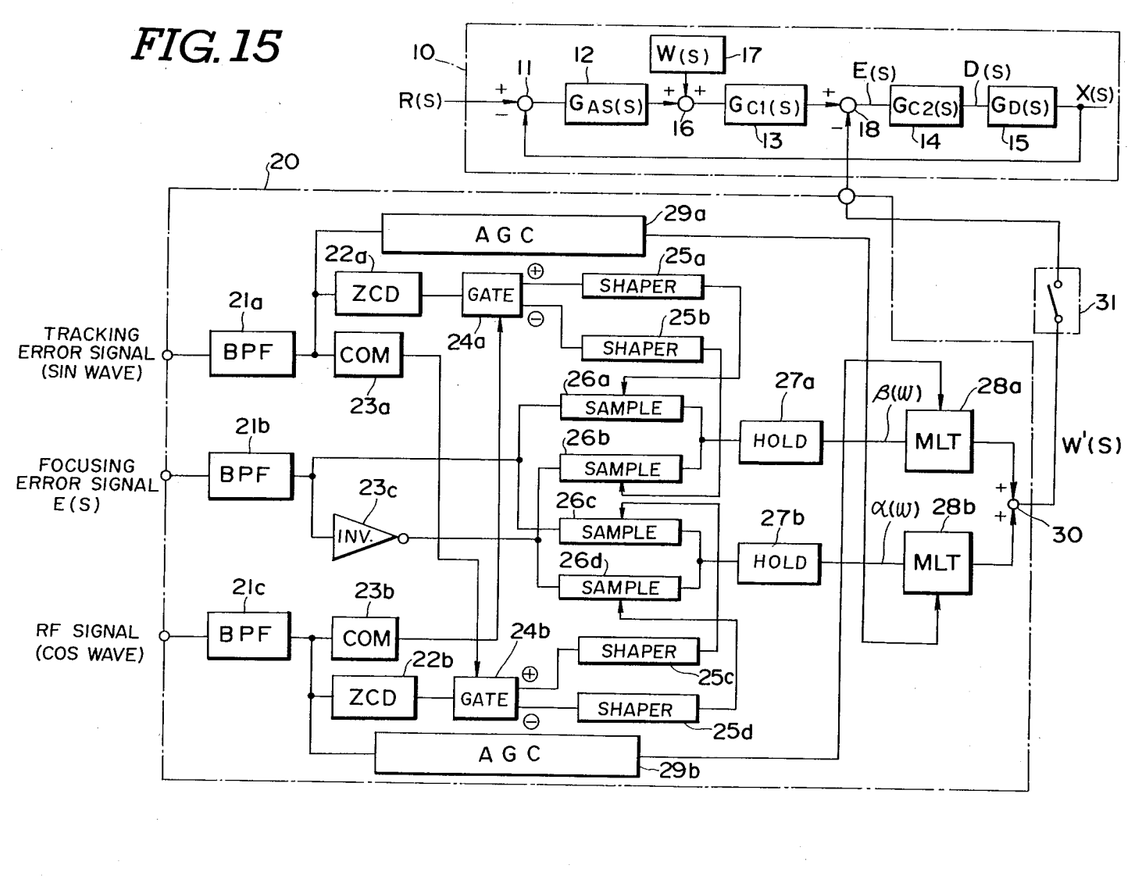
FIG. 15 is a block diagram showing one embodiment of a focusing control apparatus made in accordance with the invention.

Referring to FIG. 15, there is illustrated one embodiment of a focusing servo circuit made in accordance with the invention. Like reference numerals have been applied to FIG. 15 with respect to the equivalent components shown in FIG. 1. The disturbance canceling circuit 20 receives the tracking error signal TE, the focusing error signal FE and the main or RF signal fed from the photodetector. The tracking error signal is applied to a band pass filter 21a for filtering out the disturbance and other electrical noise which may be superimposed on the tracking error signal. For this purpose, it is preferable for the band pass filter 21a to have a pass band ranging from about 2 kHz to about 100 kHz. The filtered signal is applied from the band pass filter 21a to a zero crossing detector 22a which produces a pulse to a gate circuit 24a each time the filtered signal crosses zero. The gate circuit 24a has positive and negative output terminals connected respectively to waveform shaper circuits 25a and 25b. The focusing error signal FE is applied to a band pass filter 21b having the same characteristic as the band pass filter 21a. The filtered signal is applied to sampling circuits 26a and 26c and also through an inverter 23c to sampling circuits 26b and 26d. The RF signal is applied to a band pass filter 21c having the same characteristic as the band pass filter 21a. The filtered signal is applied to a zero crossing detector 22b. The zero crossing detector 22b produces a pulse to a gate circuit 24b each time the filtered signal crosses zero. The gate circuit 24b has positive and negative output terminals connected respectively to waveform shaper circuits 25c and 25d.

The filtered tracking error signal is also applied from the band pass filter 21a to a comparator 23a which compares the filtered signal with zero. The comparator 23a produces a logic 1 level signal to the gate circuit 24b which thereby passes the pulse from the zero crossing detector 22b to the waveform shaper circuit 25c when the filtered tracking error signal is positive. As a result, the waveform shaper circuit 25c produces a sampling pulse to cause the sampling circuit 26c to sample the filtered focusing error signal fed thereto from the band pass filter 21b. The sampled value is held in a holding circuit 27b. When the filtered tracking error signal is negative, the comparator 23a produces a logic 0 level signal to the gate circuit 24b which thereby passes the pulse from the zero crossing detector 22b to the waveform shaper circuit 25d. As a result, the waveform shaper circuit 25d produces a sampling pulse to cause the sampling circuit 26d to sample the inverted focusing error signal fed thereto from the inverter 23c. The sampled value is held in the holding circuit 27. That is, the focusing error signal is sampled each time the tracking error signal crosses zero with its polarity being inverted before it is sampled when the tracking error signal is negative at the sampling times. It is, therefore, apparent that the output of the holding circuit 27b corresponds to the periodic function signal $\alpha(\omega)$ as indicated by the waveform 12a of FIG. 12. The periodic function signal $\alpha(\omega)$ is applied to a multiplier circuit 28b.

Similarly, the filtered RF signal is also applied from the band pass filter 21c to a comparator 23b which compares the filtered signal with zero. The comparator 23b produces a logic 1 level signal to the gate circuit 24a which thereby passes the pulse from the zero crossing detector 22a to the waveform shaper circuit 25a when the filtered RF signal is positive. As a result, the waveform shaper circuit 25a produces a sampling pulse to cause the sampling circuit 26a to sample the filtered focusing error signal fed thereto from the band pass filter 21b. The sampled value is held in a holding circuit 27a. When the filtered RF signal is negative, the comparator 23b produces a logic 0 level signal to the gate circuit 24a which thereby passes the pulse from the zero crossing detector 22a to the waveform shaper circuit 25b. As a result, the waveform shaper circuit 25b produces a sampling pulse to cause the sampling circuit 26b to sample the inverted focusing error signal fed thereto from the inverter 23c. The sampled value is held in the holding circuit 27. That is, the focusing error signal is sampled each time the RF signal crosses zero with its polarity being inverted before it is sampled when the RF signal is negative at the sampling times. It is, therefore, apparent that the output of the holding circuit 27a corresponds to the periodic function signal $\alpha(\omega)$ as indicated by the waveform 13a of FIG. 13. The periodic function signal $\beta(\omega)$ is applied to a multiplier circuit 28a.

An automatic gain control circuit 29a receives the filtered tracking error signal from the band pass filter 21a and converts it into a tracking error signal having a predetermined amplitude (in the illustrated case (1)). The automatic gain control circuit 29a may be arranged to detect the positive and negative peaks of the amplitude of the input signal and adjust its gain in accordance with the detected peaks. The signal is fed from the automatic gain control circuit 29a to the multiplier circuit 28b which multiplies it by the periodic function signal $\alpha(\omega)$ to produce an output signal, as indicated by the waveform 12c of FIG. 12. A similar automatic gain control circuit 29b receives the filtered RF signal from the band pass filter 21c and converts it into an RF signal having a predetermined amplitude (in the illustrated case (1)). The signal is fed from the automatic gain control circuit 29b to the multiplier circuit 28a which multiplies it by the periodic function signal $\alpha(\omega)$ to produce an output signal, as indicated by the waveform 13c of FIG. 13. These output signals are fed to an adder circuit 30 which adds them to produce an output signal indicative of a composed disturbance W'(S). The output signal is applied through the switch 31 to the adder 18 which subscribes the composed disturbance indicative signal from the focussing error signal to cancel the disturbance W(S) superimposed on the focusing error signal E(S). The switch 31 is closed when the tracking control is off.

Figure 16:
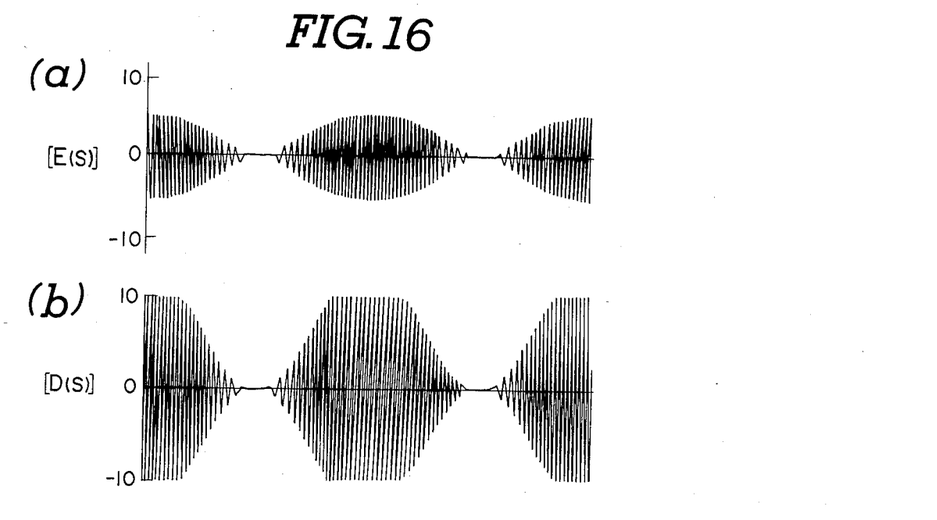
Figure 17:
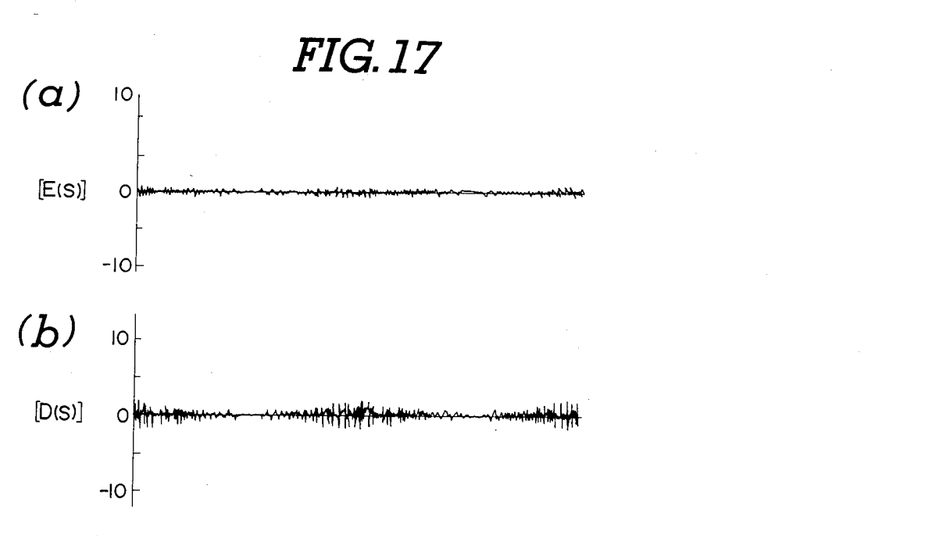

FIG. 16 comprises waveforms 16a and 16b illustrating the focusing error signal E(S) and the drive signal D(S), respectively, when the disturbance W(S) is not canceled. It can be seen from the waveform 16b that the drive signal D(S) is saturated with a great offset residual thereon. FIG. 17 comprises waveforms 17a and 17b illustrating the focusing error signal E(S) and the drive signal D(S), respectively, when the disturbance W(S) is canceled in accordance with the teachings of the invention. As can be seen from the waveform 17b, the drive signal D(S) has almost no offset residual thereon.

According to the invention, the disturbance which may be superimposed on the focusing error signal can be canceled or minimized. This eliminates the possibility of the focusing servo control from shifting into a lock-off condition even during an operational mode where the light spot is traversing the recording track formed on an optical disc. It is, therefore, possible to increase the speed of rotation of the optical disc in order to increase the data transfer rate. It is also possible to reduce costs through the use of an inexpensive optical pickup having a slow response if the optical disc is intended to rotate at the same speed as in conventional systems.

Although the focusing error signal is obtained according to an astigmatic method, it will be appreciated that the invention can be used with other focusing error detecting methods. The invention is effective in any cases where a disturbance is produced due to the interference of the 0-order and ± first-order diffraction beams included in the light beam reflected from an optical disc and superimposed on the focusing error signal when the light spot traverses the recording track formed on the optical disc.

While this invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A focusing control method employing a photodetector for generating a focusing error signal, a tracking error signal and an RF signal, and a closed loop focusing servo circuit responsive to the focusing error signal applied thereto for focusing a light spot in position on an optical disc, comprising the steps of:
   detecting the focusing error signal synchronously with the tracking error signal to produce a first periodic function signal;
   detecting the focusing error signal synchronously with the RF signal to produce a second periodic function signal;
   converting the tracking error signal into a sin-wave signal having a predetermined amplitude;
   converting the RF signal into a cos-wave signal having a predetermined amplitude;
   multiplying the first periodic function signal by the cos-wave signal to produce a first component signal;
   multiplying the second periodic function signal by the sin-wave signal to produce a second component signal;
   adding the first and second component signals to produce a composed disturbance signal; and
   subtracting the composed disturbance signal from the focusing error signal applied to said focusing servo circuit, thereby canceling a disturbance superimposed on the focusing error signal applied to the focusing servo circuit.

2. The method as claimed in claim 1, wherein the step of producing a first periodic function signal includes sampling the focusing error signal each time the tracking error signal crosses zero, the focusing error signal being inverted before it is sampled when the RF signal is negative and wherein the step of producing a second periodic function signal includes sampling the focusing error signal each time the RF signal crosses zero, the focusing error signal being inverted before it is sampled when the tracking error signal is negative.

3. A focusing control apparatus including a photodetector for generating a focusing error signal, a tracking error signal and an RF signal, and a closed loop focusing servo circuit responsive to the focusing error signal applied thereto for focusing a light spot in position on an optical disc, comprising:
   a canceling signal generator coupled to said photodetector for producing a canceling signal, said canceling signal generator including means for detecting the focusing error signal synchronously with the tracking error signal to produce a first periodic function signal, means for detecting the focusing error signal synchronously with the RF signal to produce a second periodic function signal, means for converting the tracking error signal into a sin-wave signal having a predetermined amplitude, means for converting the RF signal into a cos-wave signal having a predetermined amplitude, means for multiplying the first periodic function signal by the cos-wave signal to produce a first component signal, means for multiplying the second periodic function signal by the sin-wave to produce a second component signal, means for adding the first and second component signals to produce the canceling signal; and
   said focusing servo circuit including means coupled to said canceling signal generator for subtracting the canceling signal from the focusing error signal applied to said focusing servo circuit, thereby canceling a disturbance superimposed on the focusing error signal applied to the focusing servo circuit.

4. The apparatus as claimed in claim 3 wherein said means for detecting the focusing error signal synchronously with the tracking error signal includes a first circuit for sampling the focusing error signal each time the tracking error signal crosses zero and said means for detecting the focusing error signal synchronously with the RF signal includes a second circuit for sampling the focusing error signal each time the RF signal crosses zero.

5. The apparatus as claimed in claim 4, wherein said first circuit includes means (22d) for producing a first drive pulse each time the tracking error signal crosses zero, a first sampling circuit (26a, 27a) responsive to the first drive pulse for sampling the focusing error signal, an inverter (23c) for inverting the focusing error signal, a second sampling circuit (26b, 27a) coupled to said inverter, said second sampling circuit being responsive to the first drive pulse for sampling the inverted focusing error signal, and means (23b, 24a) for applying the first drive pulse to said first sampling circuit when the RF signal is positive and to said second sampling circuit when the RF signal is negative and wherein said second circuit includes means (22b) for producing a second drive pulse each time the RF signal crosses zero, a third sampling circuit (26c, 27b) responsive to the second drive pulse for sampling the focusing error signal, a fourth sampling circuit (26d, 27b) coupled to said inverter, said fourth sampling circuit being responsive to the second drive pulse for sampling the inverted focusing error signal, and means (23a, 24b) for applying the second drive pulse to said third sampling circuit when the tracking error signal is positive and to said fourth sampling circuit when the tracking error signal is negative.

* * * * *